(12) United States Patent
Randazzo et al.

(10) Patent No.: US 8,942,692 B2
(45) Date of Patent: *Jan. 27, 2015

(54) REMOTE MOBILE DEVICE MANAGEMENT

(75) Inventors: Phillip Randazzo, Las Vegas, NV (US); Thomas Shimkus, Las Vegas, NV (US)

(73) Assignee: Text Safe Teens, LLC, Las Vegas, NV (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/446,774

(22) Filed: Apr. 13, 2012

(65) Prior Publication Data

US 2013/0145007 A1 Jun. 6, 2013

Related U.S. Application Data

(60) Provisional application No. 61/566,587, filed on Dec. 2, 2011.

(51) Int. Cl.
*H04W 48/04* (2009.01)
*H04W 48/02* (2009.01)

(52) U.S. Cl.
USPC ............... 455/418; 455/456.1; 455/456.2; 455/456.3; 455/456.4; 455/456.6; 709/223

(58) Field of Classification Search
None
See application file for complete search history.

(56) References Cited

U.S. PATENT DOCUMENTS

| | | | |
|---|---|---|---|
| 6,301,338 B1 | 10/2001 | Makela et al. | |
| 6,687,497 B1 | 2/2004 | Parvulescu et al. | |
| 6,922,571 B1 | 7/2005 | Kinoshita | |
| 7,221,928 B2 | 5/2007 | Laird et al. | |
| 7,302,272 B2 | 11/2007 | Ackley | |
| 7,460,064 B1 | 12/2008 | Tester et al. | |
| 7,856,203 B2 | 12/2010 | Lipovski | |

(Continued)

FOREIGN PATENT DOCUMENTS

EP 1263146 B1 3/2006
WO WO 2006130146 A1 * 12/2006

(Continued)

OTHER PUBLICATIONS iSpeech, DriveSafe.ly mobile application, at least as early as Jun. 18, 2012, retrieved from <http://www.drivesafe.ly>.

(Continued)

*Primary Examiner* — Kevin Bates
*Assistant Examiner* — Jeyanath Jeyaratnam
(74) *Attorney, Agent, or Firm* — McDermott Will & Emery LLP

(57) ABSTRACT

Remote mobile device management is provided. a master user account is established based on a request from a master user and a request to associate a remote mobile device with the master user account is received. The remote mobile device is associated with the master user account and management information is received from the master user account that is associated with the remote mobile device including restriction activation information. An indication of movement is received when the remote mobile device is moving at a speed above a restriction threshold and the restriction or monitoring of at least one device capability of the remote mobile device is provided based on the restriction activation information and the indication of movement. An indication of deceleration is received when the remote mobile device has decelerated and the restoration of the at least one device capability is provided based on the indication of deceleration.

16 Claims, 11 Drawing Sheets

(56) References Cited

U.S. PATENT DOCUMENTS

| | | | |
|---|---|---|---|
| 7,869,792 B1 | 1/2011 | Zhou et al. | |
| 7,873,369 B2 | 1/2011 | Zellner et al. | |
| 7,876,205 B2 | 1/2011 | Catten et al. | |
| 8,116,726 B2 | 2/2012 | Richardson et al. | |
| 8,438,285 B2* | 5/2013 | Brown et al. | 709/226 |
| 8,633,802 B2 | 1/2014 | Wesby-Van Swaay | |
| 2002/0177928 A1 | 11/2002 | Moriguchi et al. | |
| 2003/0163685 A1 | 8/2003 | Paatero | |
| 2004/0071136 A1* | 4/2004 | Laumen et al. | 370/390 |
| 2004/0176083 A1 | 9/2004 | Shiao et al. | |
| 2005/0255874 A1 | 11/2005 | Stewart-Baxter et al. | |
| 2006/0046706 A1 | 3/2006 | Lin et al. | |
| 2006/0099940 A1 | 5/2006 | Pfleging et al. | |
| 2006/0148490 A1 | 7/2006 | Bates et al. | |
| 2006/0240860 A1 | 10/2006 | Benco et al. | |
| 2006/0293057 A1 | 12/2006 | Mazerski et al. | |
| 2007/0032225 A1 | 2/2007 | Konicek et al. | |
| 2007/0050250 A1 | 3/2007 | Abulhasan | |
| 2007/0055415 A1 | 3/2007 | Taki et al. | |
| 2007/0115113 A1 | 5/2007 | Wang | |
| 2008/0299900 A1 | 12/2008 | Lesyna | |
| 2009/0055187 A1 | 2/2009 | Leventhal et al. | |
| 2009/0085728 A1 | 4/2009 | Catten et al. | |
| 2009/0098855 A1 | 4/2009 | Fernandez et al. | |
| 2009/0098880 A1 | 4/2009 | Lindquist | |
| 2009/0149168 A1 | 6/2009 | McLean | |
| 2009/0215466 A1 | 8/2009 | Ahl et al. | |
| 2009/0251282 A1 | 10/2009 | Fitzgerald et al. | |
| 2009/0253423 A1 | 10/2009 | Kullberg | |
| 2009/0312038 A1* | 12/2009 | Gildea | 455/456.4 |
| 2010/0022255 A1 | 1/2010 | Singhal | |
| 2010/0035588 A1 | 2/2010 | Adler et al. | |
| 2010/0041383 A1 | 2/2010 | Fournier | |
| 2010/0062788 A1 | 3/2010 | Nagorniak | |
| 2010/0197351 A1 | 8/2010 | Ewell, Jr. et al. | |
| 2010/0216509 A1 | 8/2010 | Riemer et al. | |
| 2010/0227605 A1 | 9/2010 | Fournier | |
| 2010/0281126 A1* | 11/2010 | Masuda | 709/206 |
| 2010/0295946 A1* | 11/2010 | Reed et al. | 348/164 |
| 2010/0311336 A1 | 12/2010 | Huotari et al. | |
| 2011/0009107 A1 | 1/2011 | Guba et al. | |
| 2011/0021234 A1 | 1/2011 | Tibbitts et al. | |
| 2011/0038367 A1* | 2/2011 | Landers et al. | 370/352 |
| 2011/0059754 A1 | 3/2011 | Cai et al. | |
| 2011/0065419 A1 | 3/2011 | Book et al. | |
| 2011/0065456 A1 | 3/2011 | Brennan et al. | |
| 2011/0077032 A1 | 3/2011 | Correale et al. | |
| 2011/0092159 A1 | 4/2011 | Park et al. | |
| 2011/0093161 A1 | 4/2011 | Zhou et al. | |
| 2011/0111724 A1 | 5/2011 | Baptiste | |
| 2011/0115618 A1 | 5/2011 | Catten et al. | |
| 2011/0130132 A1 | 6/2011 | Lipovski | |
| 2011/0136480 A1 | 6/2011 | Osann, Jr. | |
| 2011/0136509 A1 | 6/2011 | Osann, Jr. | |
| 2011/0151838 A1 | 6/2011 | Olincy et al. | |
| 2011/0151842 A1 | 6/2011 | Olincy et al. | |
| 2011/0151852 A1 | 6/2011 | Olincy et al. | |
| 2011/0195699 A1 | 8/2011 | Tadayon et al. | |
| 2011/0207441 A1 | 8/2011 | Wood | |
| 2011/0219080 A1 | 9/2011 | Mcwithey et al. | |
| 2011/0223939 A1 | 9/2011 | Osann, Jr. | |
| 2011/0244825 A1 | 10/2011 | Ewell, Jr. | |
| 2011/0244837 A1 | 10/2011 | Murata et al. | |
| 2011/0264246 A1 | 10/2011 | Pantoja et al. | |
| 2011/0269441 A1 | 11/2011 | Silver | |
| 2011/0320960 A1* | 12/2011 | Cai et al. | 715/752 |
| 2012/0021717 A1 | 1/2012 | Schmidt | |
| 2012/0028624 A1 | 2/2012 | Jedlicka et al. | |
| 2012/0040665 A1* | 2/2012 | Liu et al. | 455/426.1 |
| 2012/0058744 A1 | 3/2012 | Felt et al. | |

FOREIGN PATENT DOCUMENTS

| | | | |
|---|---|---|---|
| WO | WO 2009/048657 A1 | 4/2009 | |
| WO | WO 2009/105125 A1 | 8/2009 | |
| WO | WO 2009/105666 A1 | 8/2009 | |
| WO | WO 2011/038265 A2 | 3/2011 | |
| WO | WO 2011/038265 A3 | 3/2011 | |
| WO | WO 2011/038269 A1 | 3/2011 | |

OTHER PUBLICATIONS

NerdWorld LLC, SafeTexting mobile application, at least as early as Jun. 12, 2012, retrieved from <http://nerdworld.biz/default.aspx>.

ZoomSafer Inc., FleetSafer Vision and FleetSafer Mobile products, at least as early as Jun. 12, 2012, retrieved from <http://zoomsafer.com>.

Perez, Martin, "TextArrest stops the kiddies from texting while driving," Cell Phone News and Reviews—IntoMobile, Mar. 23, 2010, retrieved from <http://www.intomobile.com/2010/03/23/textarrest-stops-the-kiddies-from-texting-whiledriving/>.

Cellcontrol, Cellcontrol product, at least as early as Jun. 12, 2012, retrieved from <http://www.cellcontrol.com>.

SafeDrivingSystems, Key2SafeDriving product, at least as early as Jun. 12, 2012, retrieved from <http://www.safedrivingsystems.com>.

Try Safety First, Inc., Mobile Protocols, at least as early as Jun. 12, 2012, retrieved from <http://www.trysafetyfirst.com>.

Mobile Communication Technologies, LLC, at least as early as Jun. 12, 2012, retrieved from <http://stoptxting.com>.

Search Report and Written Opinion for PCT/US2012/066545 dated Feb. 22, 2013.

Turn Off the Cell Phone LLC, PhonEnforcer mobile application, at least as early as Jun. 12, 2012, retrieved from <http://turnoffthecellphone.com>.

Iconosys, Inc, DriveReply mobile application, at least as early as Jun. 12, 2012, retrieved from <http://drivereply.net>.

PhoneGuard Inc., PhoneGuard product, at least as early as Jun. 12, 2012, retrieved from <http://www.phoneguard.com/features.aspx>. I.

AT&T Services, Inc., ATT DriveMode mobile application, at least as early as Jun. 12, 2012, retrieved from <http://appworld.blackberry.com/webstore/content/55091?lang=en>.

NerdWorld, Safe Texting AR product, at least as early as Jun. 12, 2012, retrieved from <http://safetextingcampaign.com/SafeTextingAR.aspx?cms=7338>.

Sprint, Sprint Drive First product, at least as early as Jun. 12, 2012, retrieved from <http://drivefirst.sprint.com/welcome.htm>.

Aris Aliferis, Text Angel mobile application, at least as early as Jun. 12, 2012, retrieved from <http://textangel.net>.

* cited by examiner

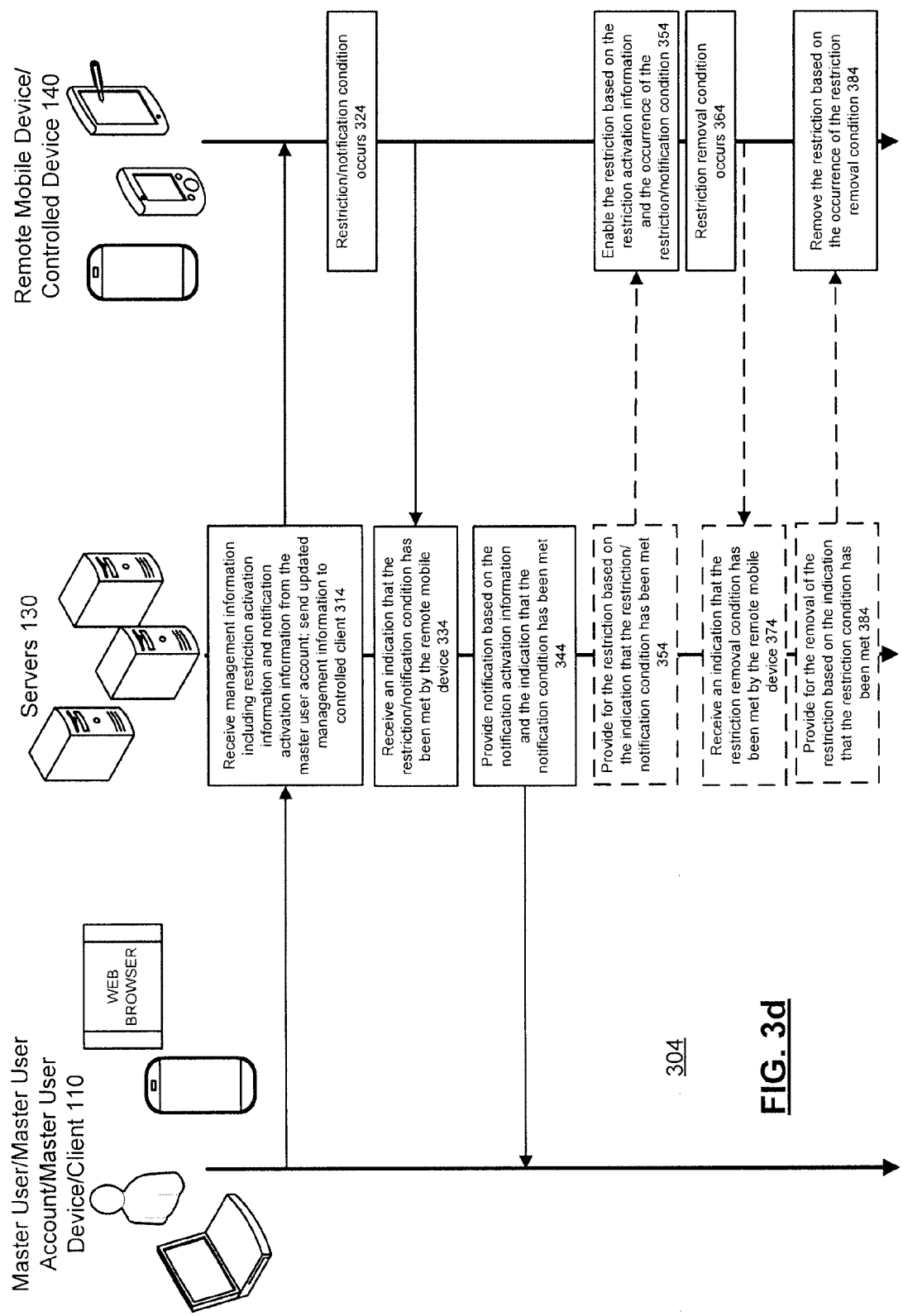

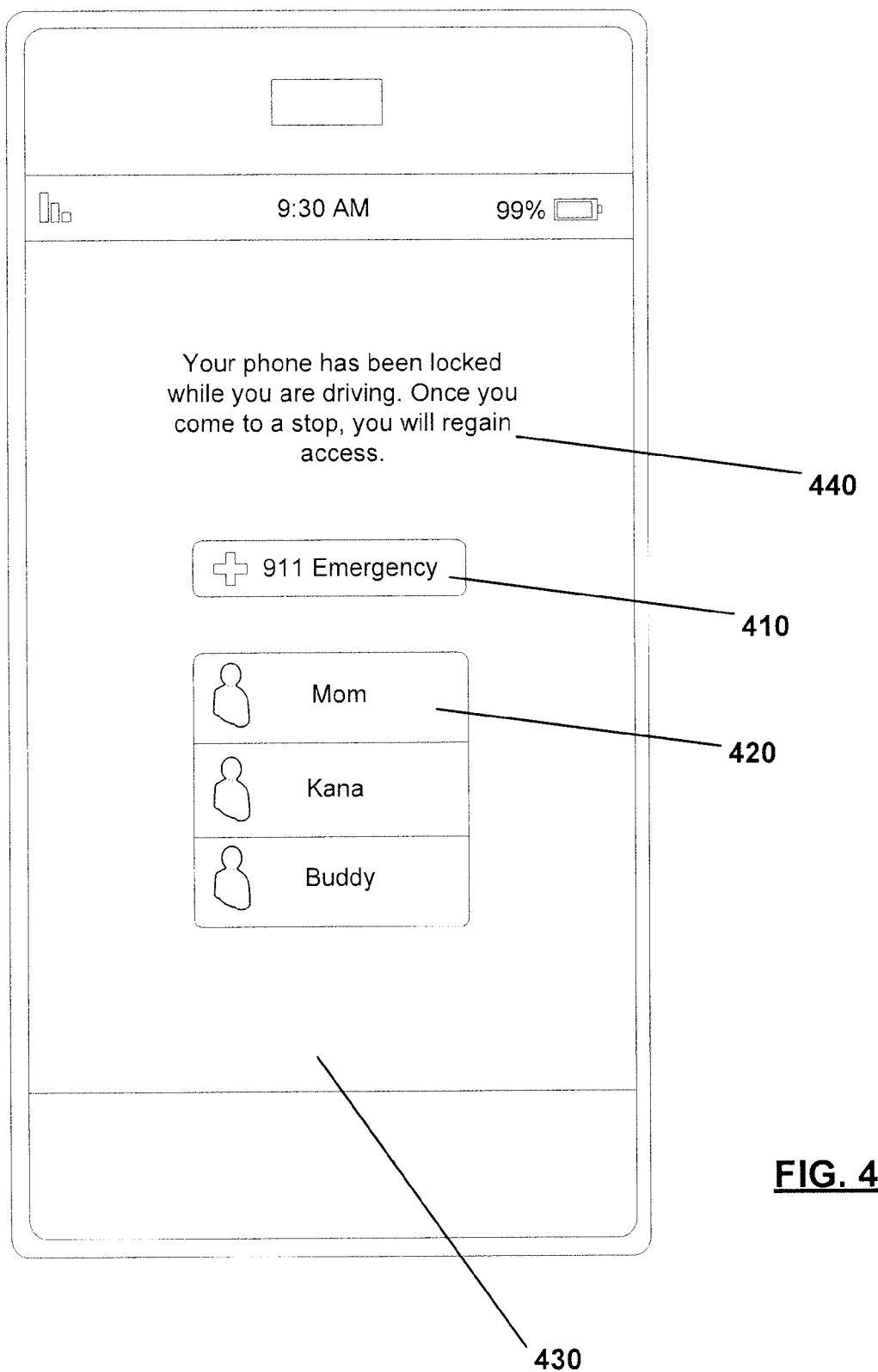

REMOTE MOBILE DEVICE MANAGEMENT

CROSS-REFERENCE TO RELATED APPLICATION

This application claims the benefit of U.S. Provisional Patent Application No. 61/566,587, filed Dec. 2, 2011, which is incorporated herein by reference in its entirety.

FEDERALLY SPONSORED RESEARCH OR DEVELOPMENT

Not Applicable.

TECHNICAL FIELD

The present disclosure generally relates to monitoring and restricting the use of mobile devices, and more particularly to managing the receipt of notifications and enabling of restrictions for a mobile device by a third party using a remote interface.

BACKGROUND

Mobile devices allow users to communicate with other users through voice, video, picture, and text mediums. Mobile devices additionally provide internet access and additional applications such as games, text editors, and social networking applications that may be used on the device. There may be situations in which use of certain functionality of a mobile device is ill-advised or even dangerous. Other uses of mobile devices create the need to monitor, notify, and restrict some or all uses of the mobile device in varying situations, locations, and at various times.

SUMMARY

According to one embodiment, the disclosed subject technology relates to a system for mobile device management. In a preferred embodiment, system includes one or more processor(s) and a memory containing processor-executable instructions. When executed by the processor(s), the system establishes a master user account based on a request from a master user and receives a request to associate a remote mobile device with the master user account. The system also receives management information from the master user account that is associated with the remote mobile device, wherein the management information includes restriction activation information and receives an indication of movement when the remote mobile device is moving at a speed above a restriction threshold. The system also provides for the restriction of at least one device capability of the remote mobile device based on the restriction activation information and the indication of movement, receives an indication of deceleration when the remote mobile device has decelerated and provides for restoration of the at least one device capability based on the indication of deceleration.

According to another embodiment, the disclosed subject technology further relates to a system for mobile device management pertaining to speed notification. The system includes one or more processor(s) and a memory containing processor-executable instructions. When executed by the processor(s), the system receives management information from a master user account that is associated with a remote mobile device, wherein the management information includes notification activation information and a speed threshold, and receives an indication of speeding when the remote mobile device is moving above the speed threshold. The system also sends a speeding notification to the master user account based on receipt of the indication of speeding and the notification activation information. In another embodiment, the speed threshold is a threshold above a posted speed limit.

According to another embodiment, the disclosed subject technology further relates to a system for mobile device management pertaining to driving and restricted use notifications. The system includes one or more processor(s) and a memory containing processor-executable instructions. When executed by the processor(s), the system establishes a master user account based on a request from a master user, receives a request to associate a remote mobile device with the master user account and associates the remote mobile device with the master user account. The system further receives management information from the master user account that is associated with the remote mobile device, wherein the management information includes notification activation information, receives a notification indication when both the remote mobile device is moving at a speed above a notification threshold and a restricted device capability is accessed by the remote mobile device, based on the notification activation information. The system also sends a notification to the master user account based on receipt of the notification indication.

According to another embodiment, the disclosed subject technology also relates to a computer-implemented method for remote mobile device management pertaining to driving based restrictions. The method includes receiving management information from a master user account that is associated with a remote mobile device, wherein the management information includes restriction activation information and receives an indication of movement when the remote mobile device is moving at a speed above a restriction threshold. The method further includes providing for the restriction of at least one device capability of the remote mobile device based on the restriction activation information and the indication of movement. The method also includes receiving an indication of deceleration when the remote mobile device has decelerated and providing for restoration of the at least one device capability based on the indication of deceleration.

According to another embodiment, the disclosed subject technology also relates to a machine-readable storage medium storing machine-executable instructions for causing a processor to perform a method for remote device management pertaining to driving based restrictions. The method includes establishing a master user account based on a request from a master user, receiving a request to associate a remote mobile device with the master user account, and associating the remote mobile device with the master user account. The method also includes receiving management information from the master user account that is associated with the remote mobile device, wherein the management information includes restriction activation information, receiving an indication of movement when the remote mobile device is moving at a speed above a restriction threshold, and providing for the restriction of at least one device capability of the remote mobile device based on the restriction activation information and the indication of movement. The method also includes receiving an indication of deceleration when the remote mobile device has decelerated and providing for restoration of the at least one device capability based on the indication of deceleration.

According to another embodiment, the disclosed subject technology further relates to a system for mobile device management pertaining to driving based restrictions. The system includes one or more processor(s) and a memory containing processor-executable instructions. When executed by the processor(s), the system receives management information from the master user account that is associated with the remote mobile device, wherein the management information includes restriction activation information. The system also determines when the remote mobile device is moving at a speed above a restriction threshold, provides for the restriction of at least one device capability of the remote mobile device based on the restriction activation information and the determination of movement, and determines when the remote mobile device has decelerated. The system also provides for restoration of the at least one device capability based on the determination of deceleration.

According to another embodiment, the disclosed subject technology further relates to a system for mobile device management pertaining to driving based restrictions. The system includes one or more processor(s) and a memory containing processor-executable instructions. When executed by the processor(s), the system receives management information from a master user account that is associated with a remote mobile device, wherein the management information includes restriction activation information, receives an indication of movement when the remote mobile device is moving at a speed above a restriction threshold, and provides for the restriction of at least one device capability of the remote mobile device based on the restriction activation information and the indication of movement. The system also receives an indication of deceleration when the remote mobile device has decelerated and provides for restoration of the at least one device capability based on the indication of deceleration.

According to another embodiment, he disclosed subject technology further relates to a system for mobile device management pertaining to time-based restrictions. The system includes one or more processor(s) and a memory containing processor-executable instructions. When executed by the processor(s), the system establishes a master user account based on a request from a master user, receives a request to associate a remote mobile device with the master user account, and associates the remote mobile device with the master use account. The system further receives management information from the master user account that is associated with the remote mobile device, wherein the management information includes restriction activation information and a time of restriction, provides for the restriction of at least one device capability of the remote mobile device based on the restriction activation information and the time of restriction, and provides for restoration of the at least one device capability based on the time of restriction.

According to another embodiment, the disclosed subject technology further relates to a system for mobile device management pertaining to location-based and time-based restrictions. The system includes one or more processor(s) and a memory containing processor-executable instructions. When executed by the processor(s), the system establishes a master user account based on a request from a master user, receives a request to associate a remote mobile device with the master user account, and associates the remote mobile device with the master user account. The system also receives management information from the master user account that is associated with the remote mobile device, wherein the management information includes restriction activation information, a time of restriction, and notification information, wherein the notification information includes instructions for sending notifications based on application activity of the remote mobile device. The system also receives an indication of use from the remote mobile device based on the restriction activation information and activation of an application of the remote mobile device corresponding to the notification information during the time of restriction, and send a notification to the master user account based on receipt of the indication of use.

According to another embodiment, the disclosed subject technology further relates to a system for mobile device management pertaining to location-based restrictions. The system includes one or more processor(s) and a memory containing processor-executable instructions. When executed by the processor(s), the system establishes a master user account based on a request from a master user, receives a request to associate a remote mobile device with the master user account, and associates the remote mobile device with the master user account. The system also receives management information from the master user account that is associated with the remote mobile device, wherein the management information includes restriction activation information and a geographic boundary, receives an indication of location arrival when the remote mobile device enters the geographic boundary, and provides for the restriction of at least one device capability of the remote mobile device based on the restriction activation information and the indication of location. The system further receives an indication of location departure when the remote mobile device exits the geographic boundary and provides for restoration of the at least one device capability based on the indication of location departure.

According to another embodiment, the disclosed subject technology further relates to a system for mobile device management pertaining to a time-based and location-based restrictions. The system includes one or more processor(s) and a memory containing processor-executable instructions. When executed by the processor(s), the system establishes a master user account based on a request from a master user, receives a request to associate a remote mobile device with the master user account, and associates the remote mobile device with the master user account. The system further receives management information from the master user account that is associated with the remote mobile device, wherein the management information includes restriction activation information, a time of restriction, and a geographic boundary of restriction. The system also receives an indication of restriction when the remote mobile device enters the geographic boundary during the time of restriction, provides for the restriction of at least one device capability of the remote mobile device based on the restriction activation information and the indication of restrictions. The system also receives an indication of non-restriction when the remote mobile device exits the geographic boundary and the time of restriction has passed and provides for restoration of the at least one device capability based on the indication of non-restriction.

According to another embodiment, the disclosed subject technology further relates to a system for mobile device management pertaining to time-based and location-based notifications. The system includes one or more processor(s) and a memory containing processor-executable instructions. When executed by the processor(s), the system establishes a master user account based on a request from a master user, receives a request to associate a remote mobile device with the master user account, and associates the remote mobile device with the master user account. The system also receives management information from the master user account that is associated with the remote mobile device, wherein the management information includes restriction activation information, a time of restriction, a geographic boundary of restriction, and notification information including instructions for sending notifications based on application activity of the remote mobile device. The system also receives an indication of use based on the restriction activation information and activation of an application of the remote mobile device corresponding to the notification information when the remote mobile device enters the geographic boundary during the time of restriction and sends a notification to the master user account based on receipt of the indication of use.

According to another embodiment, the disclosed subject technology further relates to a system for mobile device management pertaining to driving-based, time-based, and location-based restrictions. The system includes one or more processor(s) and a memory containing processor-executable instructions. When executed by the processor(s), the system establishes a master user account based on a request from a master user, receives a request to associate a remote mobile device with the master user account, and associates the remote mobile device with the master user account. The system also receives management information from the master user account that is associated with the remote mobile device, wherein the management information includes restriction activation information, a time of restriction, and a geographic boundary. The system receives an indication of restriction when the remote mobile device is moving at a speed above a restriction threshold during the time of restriction when the remote mobile device enters the geographic boundary, provides for the restriction of at least one device capability of the remote mobile device based on the restriction activation information and the indication of restriction, receives an indication of non-restriction when the remote mobile device exits the geographic boundary, the time of restriction has passed, and decelerated, and provides for restoration of the at least one device capability based on the indication of nonrestriction.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for the purpose of explanation, several aspects of the subject technology are set forth in the following figures.

FIGS. 3a-3d are process flow diagrams illustrating example processes for remote mobile device management.

FIGS. 4a-4d are illustrations of various example graphical user interfaces of the remote mobile device, the master device, and web browsers that allow access to the master user account in accordance with the subject technology.

DETAILED DESCRIPTION

Figure 1:
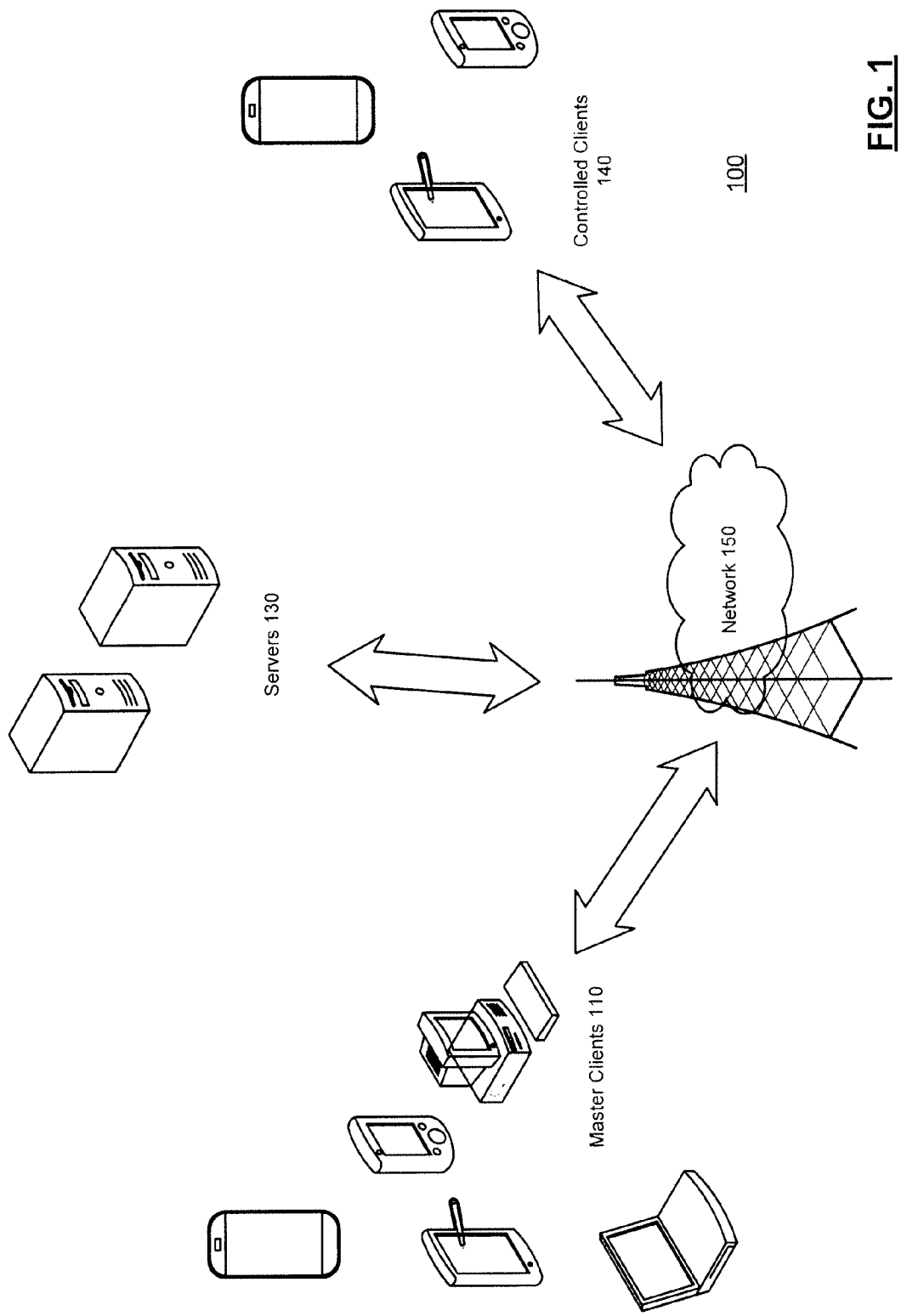
FIG. 1 illustrates an example system for remote mobile device management.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Thus, in the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

The disclosed subject technology describes systems and techniques for remote mobile device management. Remote mobile device management may include restriction of some functions of an electronic device such as a mobile phone, smartphone, tablet computer, personal digital assistant (PDA), and the like. Remote mobile device management may also include monitoring of the usage of the electronic device in the form of a notification system, or a combination of restriction and notification. Practical applications of the described systems and techniques for remote mobile device management include use of the system to promote safe driving; promote focus while at work or school; prevent distraction during sleep or study.

Remote mobile device management of the subject technology may be used to promote save driving by allowing a master user, such as a parent or employer, to place limitations on a remote user's electronic device, such as a child's phone or employee's phone, when the remote user is likely to be driving. Detection of the device's speed may be made, which may indicate that the user of the device is driving a vehicle; accordingly, restrictions may be placed on the phone to prevent the driver's distraction while driving. A master user, such as a parent, may control the types of restriction that go into effect and may turn the restriction of the phone on or off from a remote location.

Remote mobile device management of the subject technology may be used to promote focus at work/school or prevent distraction during various period of the day by creating notifications or placing restrictions on the phone during certain hours, such as during work, school, or rest hours and/or while at the workplace or on campus. A master user, such as an employer or parent, may select which applications are restricted while the user is, for example, at work or school during a specific time, to prevent use of the device for game playing, social networking, and the like. The employer or parent may also select to be notified when some applications are used on the controlled device. For instance, a message, email, or other notification may be sent to the master user when a call is made from the controlled device while at work or school.

Turning to the drawings, FIG. 1 illustrates an example system 100 for remote mobile device management. According to an embodiment, the system 100 includes master clients 110, controlled clients 140, and servers 130 connected over a network 150.

Restrictions and notifications may be imposed on the controlled clients 140 by master clients 110. Master clients 110 may send information regarding restrictions and notifications over network 150. Restriction and notification information may be associated with a master user account and the controlled clients 140 and may be stored on servers 130. Device usage information from controlled clients 140 may be sent over network 150 to servers 130. Device usage notifications may be sent over network 150 to master clients 110. Controlled clients 140 and master clients 110 may communicate with one another through network 150.

According to an embodiment, the system 100 is comprised of master client(s) 110, controlled client(s) 140, server(s) 130 and a network 150 in any combination or configuration that allows for remote mobile device management, including implementations with multiple servers 130. In various embodiments, Each of the master clients 110 can be, for example, a desktop computer, a laptop computer, a mobile device (e.g., a smartphone, tablet computer, or PDA), a set top box (e.g., for a television), a television with one or more processors embedded therein or coupled thereto, a video game console, or any other device having, preferably, a processor, memory, and communications capabilities. In various embodiments, each of the controlled clients 140 can be a portable device, for example, a laptop computer, a mobile device (e.g., a smartphone, tablet computer, or PDA) or any other portable device having, preferably, a processor, memory, and communications capabilities. In certain instances, different versions and/or configurations of the system that include subject technology as disclosed herein are available for download from a server 130 and subsequent installation on master client 110 and controlled client 140. In various embodiments, the servers 130 can be any device having a processor, memory, and communications capabilities for hosting the data for installing and hosting the system. In some example aspects, server(s) 130 can be a single computing device such as a computer server. In other aspects, server (s) 130 can represent more than one computing device working together to perform the actions of a server computer (e.g., cloud computing).

In one embodiment, the network 150 can include, for example, any one or more of a personal area network (PAN), a wireless local area network (WLAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like. The network 150 may include cellular networks with signal encoding types such as frequency division multiple access (FDMA), code division multiple access (CDMA), polarization division multiple access (PDMA), time division multiple access (TDMA) and may operate under standards such as the Global System for Mobile Communications (GSM).

Figure 2:
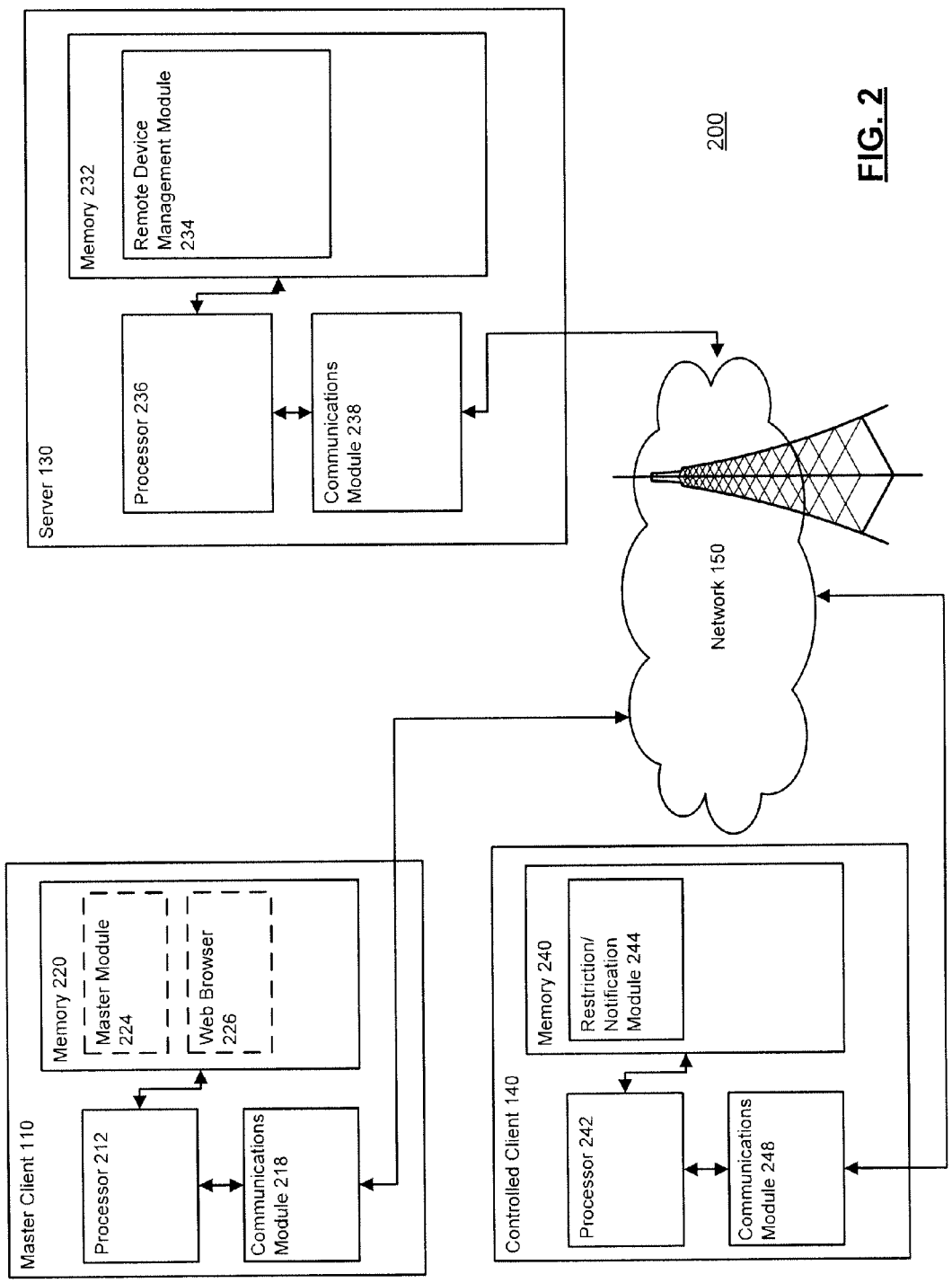
FIG. 2 is a block diagram illustrating an example client and server from the system of FIG. 1.

FIG. 2 is a block diagram illustrating an example client and server from the system 100 of FIG. 1 according to certain aspects of the subject technology. In one embodiment, the master client 110, controlled client 140, and the server 130 are connected over the network 150 via respective communications modules 218, 248, and 238 and are configured to interface with the network 150 to send and receive information, such as data, requests, responses, and commands to other devices on the network. The communications modules 218, 248, and 238 can be, for example, modems or Ethernet cards.

In one embodiment, the master client 110 includes a processor 212, the communications module 218, and a memory 220 that may include a master module 224 and a web browser 226. Memory 220 may additionally include a database containing master user account information and information regarding remote device management of controlled client 140. The processor 212 of the master client 110 is configured to execute instructions, such as instructions physically coded into the processor 212, instructions stored in memory 220, or a combination of both. For example, an input device of master client 110 (not shown) may provide input to processor 212 which is processed by the master module 224 stored in memory 220. The input may then be sent through network 150 via communications module 218 to server 130, which receives the information through communications module 238. Master module 224 may receive notification information regarding controlled client 140 and provide the notifications for display on the master client 110. Master module 224 may additionally process management information regarding controlled client 140 input by the master user of master client 110. A restriction/notification application that is downloaded and installed on master client 110 may be composed of or include master module 224. Alternatively, portions of master module 224 may be an installed restriction/notification application downloaded from a server 130. Web browser 226 may provide an additional or alternative access to the master user account through the internet; thus allowing web-based control of the controlled client 140 through master client 110.

The controlled client 140, in one embodiment, includes a processor 242, the communications module 248, and a memory 240 that may include a restriction/notification module 244. Portions of restriction/notification module 244 may be downloaded from server 130 and may contain instructions that are capable of causing the restriction of device capabilities of controlled client 140 and/or allow for the sending of notifications from controlled client 140. Restriction/notification module 244 may require management information received from master client 110 or a master user account to fully implement restrictions and/or notifications. Restriction/notification module 244 may also execute instructions sent from servers 130. Memory 240 may additionally include a database containing restriction and notification information and information associating the controlled client 140 to one or more master clients 110. The processor 242 of the controlled client 140 is configured to execute instructions, such as instructions physically coded into the processor 242, instructions stored in memory 240, or a combination of both. For example, an input device of controlled client 140 (not shown) may provide input to processor 242 which is processed by the restriction/notification module 244 stored in memory 240. The input may then be sent through network 150 via communications module 248 to server 130, which receives the information through communications module 238. Restriction/notification module 244 may receive restriction/notification information from master client 110 and provide for the restriction and/or notification of one or more controlled client 140 device capabilities based on the received restriction/notification information.

In one embodiment, server 130 includes a processor 236, the communications module 238, and a memory 232 that may include a remote device management module 234. Memory 232 may additionally include a database including information for multiple master user accounts, the controlled clients 140 associated with the master user accounts, and information for master clients 110 associated with the master user accounts. The databases may include restriction and/or notification information associated with the master user accounts for the control of controlled clients 140. Processor 236 is configured to execute instructions, such as instructions physically coded into the processor 236, instructions stored in memory 232, or a combination of both. Processor 236 processes information from remote device management module 234 and sends information through communications module 238, through network 150, to master client 110.

FIGS. 3*a*-3*d* are process flow diagrams illustrating example processes for remote mobile device management as shown by example master user account/master user device/ master client 110, example servers 130, and example remote mobile device/controlled device 140. Dashed lines represent some of many possible variations in the process flows. Portions of or all of the process flows 301-304 illustrated in FIGS. 3a-3d may be combined, repeated, taken out of the illustrated order, or integrated into other portions of the process flow without straying from the subject technology. Although processes 301-304 of FIGS. 3a-3d are described with reference to FIG. 1, the processes are not limited to such configurations and can be applied to other systems and configurations.

Figure 3A:
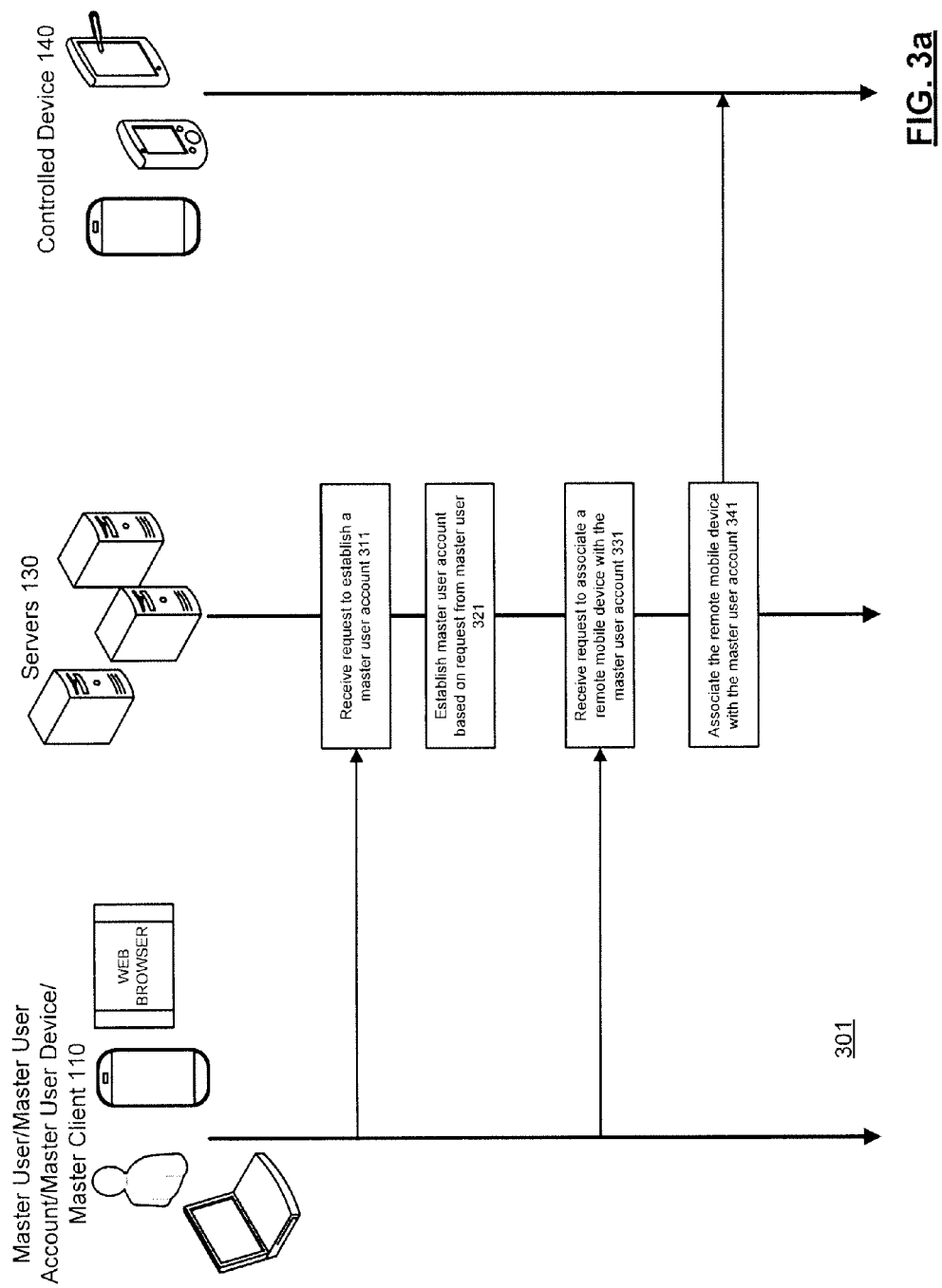

FIG. 3a illustrates an example process flow diagram 301 for remote mobile device management as shown by the example master client 110, example controlled client 140 and example server 130 of FIG. 1. A master user may act from a web browser, a master user device, or a web browser of a master user device and may request to establish a master user account through a master client 110 in process flow step 311. The term "master user" as used herein encompasses its plain and ordinary meaning, including, but not limited to, any user who establishes a master user account that manages remote mobile devices (e.g., another user's mobile phone) through the master user account. Multiple users may constitute a single master user (e.g., two parents have a single master user account to remotely manage the mobile devices of their children). A master user may have multiple master user accounts managing multiple remote mobile devices.

A "master user device" as used herein encompasses its plain and ordinary meaning, including, but not limited to, a device or master client 110 associated with the master user that provides access to the master user account and allows for the remote management of other controlled clients 140, including, but not limited to mobile devices. A "master user device" may, but need not, be a portable device. Access to the master user account may be provided by virtue of an application installed on the device, through a web browser installed on the device, or a combination of the two.

Although a master user account may be accessible through a web browser on multiple client devices, the term "master user device" as used herein including the claims, refer to devices that are not the same device as any of the remote mobile devices (i.e., controlled clients 140) controlled by the master user account or master user device. A device that functions as a master user device may have the capability of being controlled by other clients 110 through the techniques of the subject technology as contained herein; however, in the context in which the master user device is controlled by another device, the master user device becomes the remote mobile device (e.g., a father's mobile phone may be the master user device with respect to his child's phone, but the father's mobile phone may be the remote mobile device, and thus not the master user device, with respect to his wife's phone). The master user device is a physically separate device from the remote mobile device that it manages. Multiple master user devices may be associated with a single master user account. A single master user device may be associated with multiple master user accounts. A master user account may be accessed from devices that are not master user devices. Master user account information may be locally stored on a master user device. The master user account interface may allow the master user to invite the master user's contact to share the application. The master user account interface may allow the master user to purchase a subscription or downloadable applications of the subject technology on behalf of another user as a gift.

The term "master user account" as used herein encompasses its plain and ordinary meaning, including, but not limited to, an account from which one remotely manages one or more mobile devices. A master user account may be accessed from a web browser installed on a master user device (e.g., master client 110) or directly through a master user device through an application that has been installed on the master user device. A master user account allows the master user to associate one or more remote mobile devices with the master user account to allow remote mobile device management. Multiple users may be associated with a single master user account. Multiple remote mobile devices may be individually managed from a single master user account. A user may have multiple master user accounts. The master user account and data associated with the master user account may be stored on servers 130. The master user account may be protected by one or more passwords or by any other security measure. The master user account may be associated with a master user device.

In one embodiment, a server 130 establishes a master user account based on the request from a master user in flow process step 311. The request may be made from a device that may become a master device associated with the created master user account. The request may include identifying information on one or more master users and may require the payment of a one-time fee or a recurring subscription fee. The master user account may require the formulation of user-identifying information such as a user name, password, or the like. The master user account may require identifying information of the master user such as a telephone number, account number, or physical address associated with the master user.

The server 130 establishes the master user account based on the request from master user in flow process step 321. Information associated with the master user account may be stored on server 130. After the master user account is established, a master user acting through the master user account via the web browser and/or a master user device may initiate a request to associate a remote mobile device (i.e., controlled client 140) with the master user account. The request to associate a remote mobile device with the master user account is received by the servers 130 in flow process step 331. The remote mobile device may be identified by a telephone number, an account number, or any other identifying information. The master user may designate a user name for the remote mobile device that is used within master user interfaces of the master user account for ease of reference for the master user.

In one embodiment, the servers 130 then associate the remote mobile device with the master user account in flow process step 341. Association of the remote mobile device may require download of information or an application to the remote mobile device itself. The association of the remote mobile device with the master user account may require the physical entry of a password, token, or other identifying information provided to the master user account, and input into the remote mobile device in order to complete the association of the remote mobile device with the master user account.

Figure 3B:
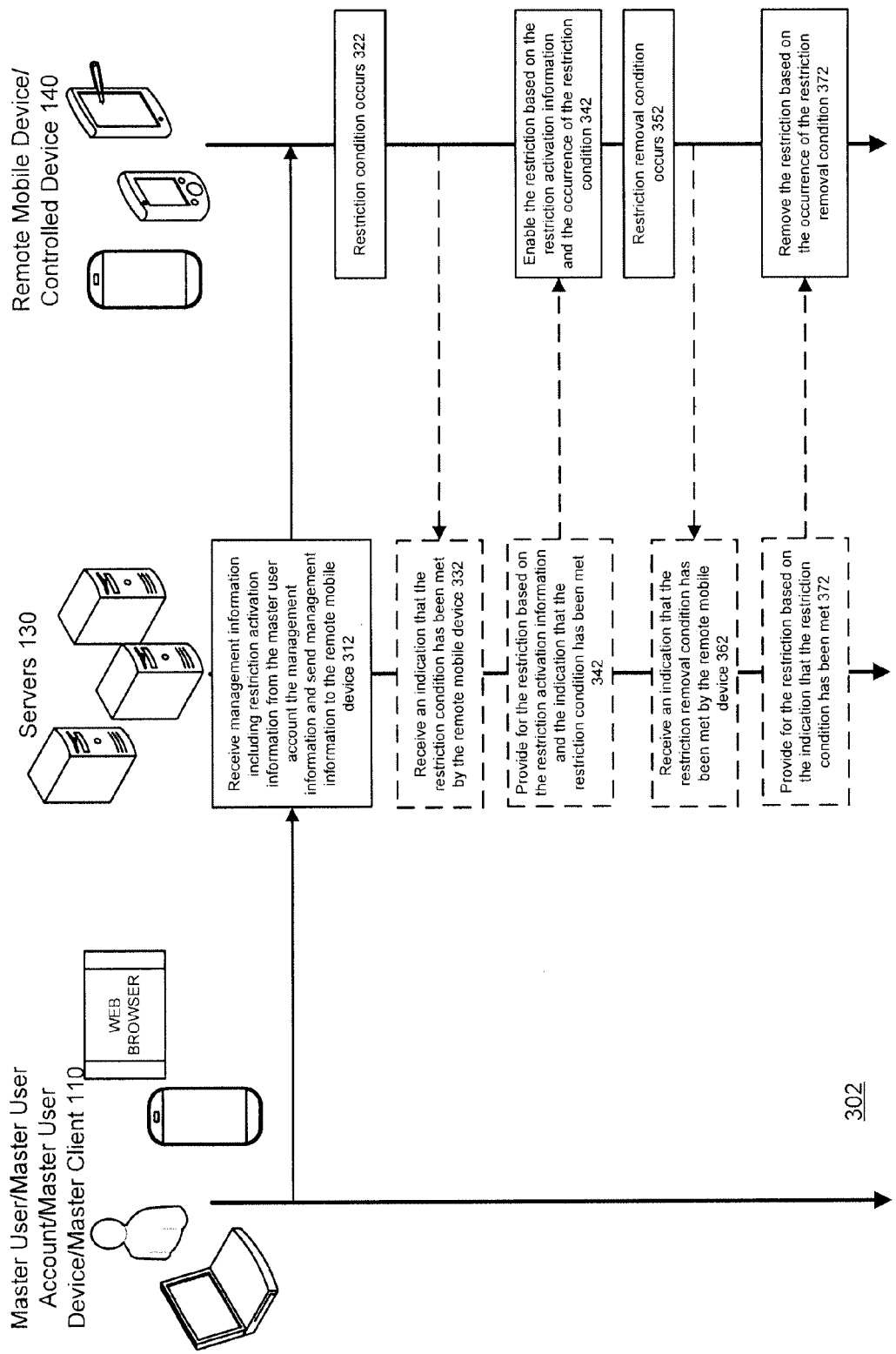
Figure 3C:
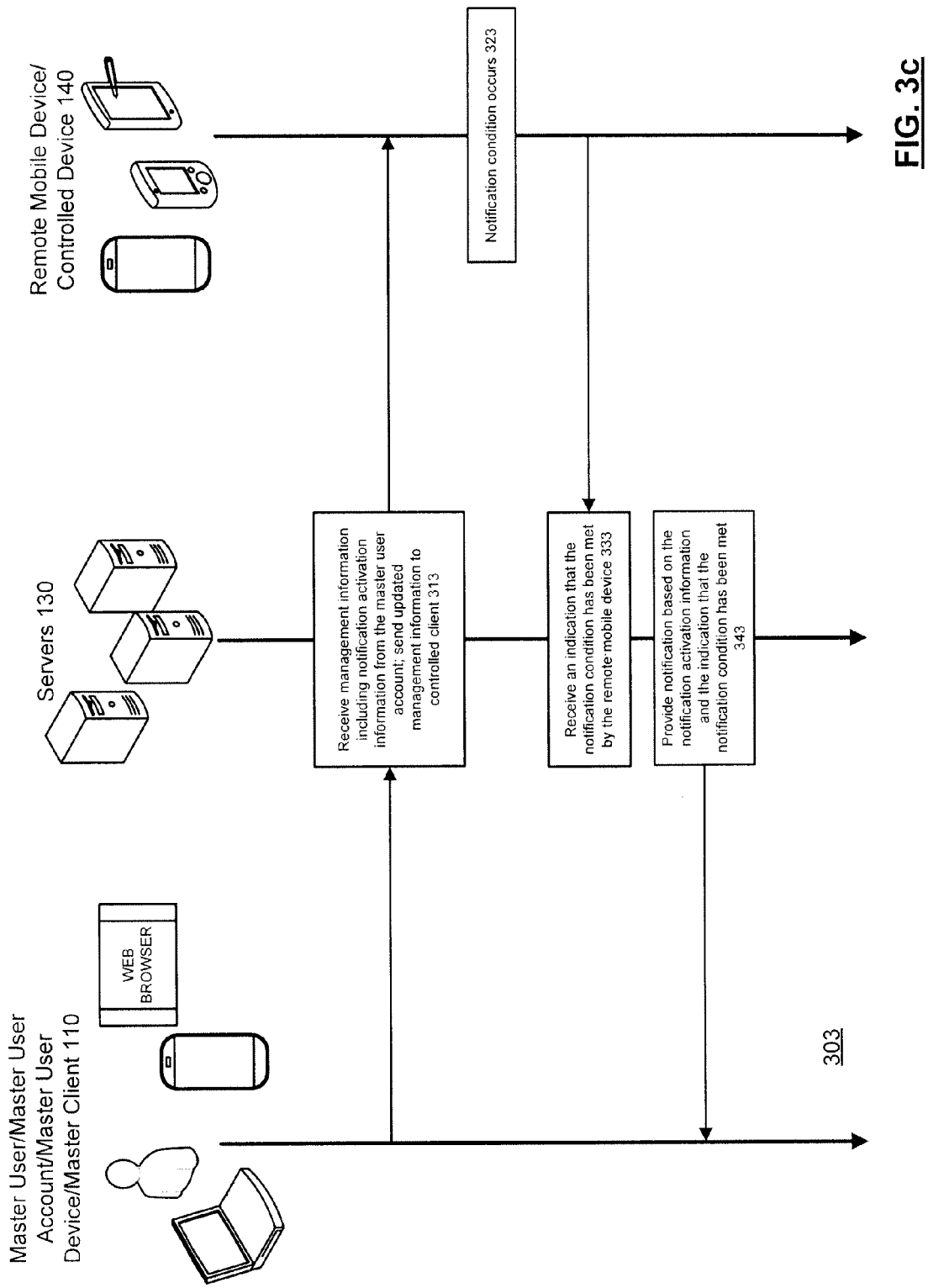

FIGS. 3b-3d illustrate examples of process flows 302-304 for remote mobile device management of the remote mobile device once a master user account is created and a remote mobile device is associated with the master user account as shown by the example master client 110, example controlled client 140 and server 130 of FIG. 1. Multiple remote mobile devices may be associated with the master user account at any time during any of the processes of FIGS. 3b-3d in the manner illustrated by FIG. 3a.

Restriction and monitoring of a remote mobile device is customized through the use of management information. The term "management information" as used herein encompasses its plain and ordinary meaning, including, but not limited to, information established through the master user account that governs the restriction and/or monitoring of the remote mobile devices associated with the master user account. Management information may be restricted such that it may not be altered from the remote mobile device to which it applies. Management information may be specific to each remote mobile device controlled by a single or multiple master user account, or portions of management information may be applied to multiple remote mobile devices associated with the master user account. Management information may include information regarding the types of remote mobile device capabilities that are restricted, the conditions under which a restriction is enabled, types of conditions for which a notification to be sent, and the like. Remote mobile device monitoring may be based on notifications sent from the master user account based on the activity and usage of the remote mobile device. Management information may include information indicating whether portions of the restriction/notification system are "on" or "off," restriction conditions and constraints associated when a restriction is enabled or disabled, information regarding what device capabilities are restricted, and monitoring information including notification information. Restrictions and notifications may be independently turned "on" or "off" through the master user account at any time. "On" or "off" status of restrictions and notifications are determined by master user entry of restriction activation information and notification activation information included in the management information. Turning a restriction/notification "on" indicates that the restriction/notification will occur if the restriction/notification condition occurs. Turning a restriction/notification "off" indicates that no restriction/notification will occur regardless of whether a restriction/notification condition occurs. If the restriction/notification is turned "off" while during a period of restriction of the remote mobile device, the restriction of the remote mobile device will be overridden and the restrictions will be removed upon receipt of the change of restriction activation information from the user. Individual restrictions or notifications may be turned "on" and "off" individually, in any combinations, or all restrictions and notifications may be globally turned "on" and "off" for each remote mobile device.

A restriction or notification may be enabled/sent based on the occurrence of one or more restriction conditions associated with motion of the device, the geographic location of the device, or time. Restriction/notification conditions may be entered via the master user account as management information. A preset default value may be provided for some aspects of restrictions/notifications if a master user entered value is not entered. A restriction may be enabled and a notification may be sent based on the same condition.

A restriction may affect one or more capabilities of the remote mobile device. A restriction may limit, disable, or alter one or more capabilities of the remote mobile device while the restriction is enabled. Some capabilities of the remote mobile device, such as voice communication capabilities specific to emergency services, may not be limited in any way by any restriction of the subject technology. For example, emergency services contact capabilities (such as 911 inbound or outbound call capabilities) cannot be disabled or restricted by any master user, through the master user account, or from the master device. Limitations or constraints on the restriction of device capabilities may additionally be entered as management information through the master user account.

Notification information included in the management information may include condition and constraint information associated with when a notification should be sent, the type of notification that is sent, and the content included in the notification. Notification information may include notifications sent to the master user account, the master device, or may be sent to the master user through another medium, such as an associated master user email account. A notification may be a text message, an email, a voice mail message to the master device with an automated message, sort message service, and the like. One or more notifications may be sent based on the occurrence of a single notification condition. Notifications may also be sent to another user that attempts to communicate with the remote mobile device while that method of communication is restricted on the device. Notifications may also be displayed to the user of the remote mobile device.

Any notification may be customized through the master user account. A user interface allows the master user to determine what type of notification should be sent, the conditions under which the notification is sent, when the notifications are turned "on" and "off," the content for the notification, and for which remote mobile device the notifications are to be sent.

FIG. 3b illustrates an example process flow 302 for remote mobile device management including restrictions of the remote mobile device. In flow process step 312, management information including restriction activation information may be sent from the master user account to servers 130. The restriction activation information indicates whether restrictions are "on" or "off." Restriction condition information may also be included in the management information sent to the servers 130, or preset default conditions may be set if no restriction condition information is included in the management information. The ability to enable and disable the restriction system provides the master user with flexibility to control the restriction system from a remote location at any time.

In flow process step 322, the restriction condition occurs at the remote mobile device. The occurrence of the restriction condition 322 may cause the remote mobile device to enable the restriction directly in step 342 if the last received restriction activation information received from the master user account indicates that the restriction has been turned "on." Alternatively, the occurrence of the restriction condition may cause the remote mobile device to send an indication to the servers 130 that the restriction condition has been met. Servers 130 may then identify whether the master user account information indicates that the restriction activation information of indicates that the restriction is turned "on." If so, then the servers 342 may provide for the restriction based on the received indication by instructing the remote mobile device to enable the restriction.

The removal of a restriction as illustrated in steps 352, 362, and 372 may occur in much the same manner as the enablement of the restriction as disclosed above. The restriction removal condition may be a condition that is distinct from the restriction condition. Alternatively, the restriction removal condition may require only that the restriction condition is no longer met. Restriction removal condition information may be customized and included in the management information of step 312.

Specific applications and examples of the example flow process 302 will now be described. These specific applications and examples are provided by way of example and illustration only, and are not intended to limit the subject technology in any manner.

A motion-based restriction may be implemented to promote safe driving by the user of the remote mobile device. One condition for this motion/driving restriction is based on the movement of the device. The movement of the remote mobile device may be determined based on one or more of global positioning system (GPS) information, multilateration, or other techniques from which the speed of the remote mobile device may be determined. The restriction condition may be in the form of a restriction threshold and may be a predetermined default value or may be restriction threshold set by the master user. The restriction threshold speed should be set such that the threshold amount is above speeds that may indicate human powered movement such as walking or running, and the threshold amount should be sufficiently low to provide an early indication that the controlled user is driving a car. Five miles per hour and ten miles per hour are examples of preset default values for a restriction threshold. If the restriction activation information indicates that the restriction is "on," then the driving restriction is enabled when the motion of the device is detected to exceed the restriction threshold speed. The restriction removal condition may be the deceleration of the remote mobile device. The restriction removal condition may be that the remote mobile device had decelerated below the restriction threshold speed or that the motion of the device has stopped.

The restriction removal condition for the driving restriction may have an automatic delay to prevent the restriction from being lifted while the driver is at a stop light, stop sign, or caught in traffic. The time of delay may be set by the master user through the management information or may be a preset value such as one minute or two minutes. The present time period may be any other length of time that is long enough to account for the length time the driver may be temporarily stopped while driving and short enough to prevent unnecessary restriction of remote mobile device capabilities once the driver has arrived at a destination. If the device begins moving or accelerating above the restriction threshold speed before the end of the delay period, the restrictions remain in place until the device has again stopped moving or decelerated below the restriction removal speed threshold for the full delay.

The types of device capabilities that are restricted when the device moves above the restriction threshold speed in the motion-based example may also be included in the management information and may be set through the master user account. The restriction of the device capabilities may be preset defaults if not included in the management information. The device may be restricted such that input capabilities of the remote mobile device are restricted. For instance, a keypad and/or touchscreen of the remote mobile device may be restricted such that only emergency services communication capabilities are available. Incoming communications may be restricted such that incoming calls, messages, emails, text messages, and other types of communications are restricted. Incoming phone calls may be restricted such that the caller receives a busy signal, is sent directly to voice mail, or receives an automated response indicating that the caller is unavailable.

An automated response may include a personal message, a preset message, and may include an advertisement as a portion of the automated response. Advertisements included as a portion of the automated response may additionally provide an incentive, coupon, or game-type component to encourage users to continue use of the driving restriction. The advertisement may invite the inbound caller to create a master user account. The ringer of the remote mobile device may be disabled such that an indication of the incoming communication is restricted.

In addition to maintaining emergency service call capabilities during the period of driving restriction, the master user may indicate other authorized callers that may not be restricted when the restriction is enabled. The master user may enter these authorized callers by entering telephone numbers and user names associated with the telephone numbers as a portion of the management information. An icon may appear on the user interface during the time of restriction that allows the remote mobile device user to call emergency services or an authorized caller by interacting with the touchscreen. A keypad that is otherwise restricted during the driving restriction may also allow outbound calls to emergency services or to an authorized caller. That is, keys that are pressed in the sequence of an emergency service or authorized caller telephone number results in the placement of a telephone call and function as exceptions to the keypad restriction. Incoming calls from emergency services and authorized callers may also not be subject to the restriction. The driving restriction may be set such that incoming and outgoing calls from/to emergency services and authorized callers are the only remote mobile device capabilities that remain enabled when the driving restriction is enabled.

Similarly, other exceptions to remote mobile device restrictions may be included in the management information. For example, voice telephone calls through the remote mobile device maybe restricted, however the management information may include information that allows voice calls routed through hands-free devices (e.g., a headset, wireless headset, or a hands-free device that is installed in a vehicle) associated with the remote mobile device as an exception to the restriction of voice calling capabilities. Voice activated dialing may also be indicated in the management information as an exception to a restriction of voice calling capabilities. Device restrictions and exceptions for the driving restriction may include any one or more of the above possibilities or may include any other type of device restriction disclosed herein.

As another example, a location-based restriction may be implemented to promote focus while at work, school, or otherwise. The condition for this location/work/school/etc. restriction is based on the geographic location of the device. The location of the remote mobile device may be determined based one or more of GPS information, multilateration, or other techniques from which the geographic location of the remote mobile device may be determined. The restriction condition may be in the form of a geographic boundary. The geographic boundary may be set as an address with a radius to determine a geographic area for the restriction. The radius may be a preset or information included in the management information. The radius may be any value, and may be set such that the geographic boundary essentially represents one building (e.g., a school, mall, or office building), an larger area (e.g., a university campus or office complex), or a larger area (e.g., a city or town). A preset value for the radius may be one thousand feet. If the restriction activation information indicates that the restriction is "on," then the location restriction is enabled when the remote mobile device enters the geographic area enclosed by the geographic boundary. The restriction removal condition may be that the mobile device has moved outside the geographic boundary area.

The types of device capabilities that are restricted when the device moves into the geographic boundary area may include any one or more of the restrictions disclosed herein. Types of device capabilities that are disclosed with respect to a location-based restriction may be applied to other examples. One type of device capability that may be restricted in this example includes the limited use of specific remote mobile device applications including, but not limited to game application, social networking applications, shopping applications, toy applications, photo/video applications, and the like.

Internet usage may also be limited or restricted entirely. Specific websites or applications may be allowed or restricted based on information included in management information. Applications and internet usage may be restricted following a time length use-based threshold amount. For example, once the geographic location is entered and the location-based restriction is in effect, a restriction of a social networking application may allow the application to be open on the remote mobile device for a total of thirty minutes while the device remains within the geographic boundary.

A time-based restriction may also be implemented, for example, to prevent distraction during sleep or study. The condition for this time-based/sleep/study/etc. restriction is based on occurrence of a period of time during which the device is restricted. The restriction condition may be in the form of a start time, a start time and a duration, or a start time and an end time. Such a restriction may be set to operate specifically on certain days of the week, may be individually planned, or may be spontaneously implemented through master user entered information included in the management information. A specific number of recurrences may be set for the repetition of a time-based restriction, or the restriction may be set to repeat at a regular interval.

The type of remote mobile device capabilities may be any one or combination of the device restrictions disclosed herein. In addition to the combination of multiple restriction of device capabilities, the conditions under which a restriction is enabled may be dependent on multiple conditions.

For example, a motion-based/driving restriction may require the motion of the device to occur within a specific geographic area, during a specific period of time, both within a specific geographic region and during a specific time period, or neither. Alternatively, a restriction may be disabled based on one or more condition. For example, a motion-based/driving restriction may not be enabled if the motion of the device occurs during a specific period of time. Such a combination may prevent the needless restriction of the remote mobile device if the master user has determined that the user may be in motion during a period of time, but the user will not be the driver (e.g., the remote mobile device user is on a train, airplane, or will be a passenger in another driver's vehicle). Combination condition information may be included in the management information. The restoration removal condition may occur when one or all of the combined restriction conditions are no longer occurring.

FIG. 3c illustrates an example process flow diagram 303 for remote mobile device management including monitoring of the remote mobile device in the form of notifications. In the flow process step 313, the servers 130 may receive management information including notification activation information that may be sent from the master user account to servers 130. The notification activation information from the master user account indicates whether the notifications are "on" or "off." Notification condition information may also be included in the management information sent to the servers 130, or preset default conditions may be set if no notification condition information is included in the management information. The ability to enable and disable the notification system provides the master user with flexibility to control the notification system from a remote location at any time.

In flow process step 323, the notification condition occurs at the remote mobile device. The remote mobile device may send an indication to the servers 130 that the notification condition has been met in flow process step 333. If the notification activation information received from the master user account indicates that the notification has been turned "on," a notification is generated and sent to the master user account in process flow step 343. The notification may be sent to the master user device, to an email address associated with the master user account, or through another form of communication that is associated with the master user and the master user account. The process 303 may be repeated in the same manner with respect to a notification that is to be sent when the original notification condition ceases to occur. A notification sent based on the original notification condition ceasing to occur may be a condition that is distinct from the restriction or may be a condition that requires only that the original notification condition is no longer met. This type of notification information may also be included in management information of step 313 along with notification condition information.

Specific applications and examples of the example flow process 303 will now be described. These specific applications and examples are provided by way of example and illustration only and are not intended to limit the subject technology in any manner.

In another embodiment, a speed based notification for a remote mobile device user that is speeding may be sent to the master user account, and a threshold amount of speed over a posted speed limit or over a maximum value may constitute the notification condition for a speed application. Speed based notifications may encourage the user of the remote mobile device to drive safely and additionally allows the master user to be better informed of the driving behavior of the remote mobile device user. The notification condition can be established by a preset value or may be entered through the master user account as management information. An example of a preset value for a threshold amount of speeding may be ten miles per hour over the posted speed limit (at the current location of the remote mobile device) or may consist of a threshold speed such as eighty miles per hour. The speed of the device may be determined based on one or more of global positioning system (GPS) information, multilateration, or other techniques from which the speed of the remote mobile device may be determined. The geographic location of the remote mobile device may be additionally used to determined the posted speed limit based on available speed limit information, including speed limit information stored in databases of servers 130. If the notification activation information indicates that the notification system is "on," then the speed based restriction is sent when the motion of the device exceeds the threshold amount of speeding. A second notification may be sent based on the end of the original notification condition occurrence. The end notification condition may be that the remote mobile device has decelerated below the threshold amount of speeding.

The content of the notification may include information such as the identity of the remote mobile device user, telephone number associated with the remote mobile device, a description of the condition occurrence (e.g., exceeding the posted speed limit by the threshold amount), the location of the remote mobile device at the time of the occurrence, a current date and time stamp, and the like. The second notification indicating that the remote mobile device user is no longer speeding may also include content indicating the total length of time during which the device exceeded the threshold amount of speeding.

The type of notification may be included in the management information and may be set through the master user account. The type of notification may be a preset default if no customized information included in the management information. For example, the preset default notification type for the speeding notification may be an email sent to an email address associated with the master user account.

Another example of a notification is a device tampering notification. Device tampering notifications may better inform the master user as to the efficacy of the subject technology. The device tampering condition may be established as the removal of the battery or other power supply of the remote mobile device, disabling or removal of some or all of an application on the remote mobile device associated with another restriction or notification, disabling of a GPS system or other location determining application of the remote mobile device, attempting to gain access to the associated master user account from the remote mobile device, or any other indication that an attempt to circumvent or remove the notifications and/or restrictions of the remote mobile device is occurring. Multiple device tampering conditions may be indicated in the management information, the occurrence of any one of which may cause a device tampering notification to be sent.

When the device tampering condition has occurred or upon the restoration of power to the remote mobile device (e.g., if the remote mobile device has been shut down based on the removal of the power source), a notification may be sent to the master user if the notification activation information has been set to "on." The content of the notification may indicate the method by which the device was tampered with, whether any notifications or restrictions were disabled, and the duration of the disablement, if any.

As another example, a device monitoring notification may occur based on any of the example conditions disclosed above regarding restrictions. Instead of enabling a restriction on the device based on motion, geographic location, or time; in various embodiments, a notification may be sent to the master user if the device is moving above the motion restriction threshold if the geographic boundary has been entered, if the device is used within a restricted time period, etc. A second notification may be sent to the master user once the device has decelerated, once the device has ceased being used within the restricted time period, etc., or once the remote mobile device is no longer located within the geographic boundary. Customization of these notifications may be similarly individualized in the same spirit as other notifications disclosed herein. Content of the notification itself may include an indication of what condition of the remote mobile device has occurred, identification of the remote mobile device, and a date and time stamp of the condition that occurred.

Alternative to the above examples, an indication may be sent to the server that an initial condition has occurred, but the notification is not sent until a second indication that the initial condition is received indicating that the initial condition has ceased occurring. A notification may be sent to the master user account following the second indication and the content of the notification may indicate the duration of time that the condition occurred.

Further, multiple notification conditions may be required for a single notification. For example, a motion, geographic location, or time condition that requires another condition associated with a specific device capability to occur before a notification is sent. Instead of restricting the device capability as illustrated above, the remote mobile device may be monitored through a notification that may be sent to the master device user. Exceptions may be established for notifications in the same manner as otherwise herein including the "allowed" applications, authorized websites, or authorized user-to-user communication (e.g., authorized caller information). Usage that corresponds to an application, website, or caller does not cause a notification to be sent. A length of authorized use may also be established so that an application may be used for a period of time before a notification is sent. Notifications established based on an allowed period of use may promote responsible use of entertainment applications of the remote mobile device.

For example, a notification that speeding has occurred may be sent when the device is moving at a speed that is ten miles per hour over the speed limit. The speeding notification may vary based on time of day. For instance, the speeding threshold may be set at five miles per hour over the posted speed limit during times of day that the remote mobile user is likely to be driving in a school zone and ten miles per hour over the speed limit at other times. Notifications may be customized based on geographic boundaries or a combination of time and geographic boundaries. A speed notification may be individually turned "off" and "on" by the master user.

As another speed based example, notifications may be sent in regular time intervals (e.g., every five minutes or half hour) once the remote mobile device is moving, and the notifications may be sent at regular intervals until the remote mobile device is no longer moving. Periodic speed monitoring notifications may be sent based on a speed differential instead of a regular time interval, with the notifications indicating when the remote mobile device user is driving erratically or that the driver may be having car trouble while driving. The content of speed monitoring notifications may indicate the speed of the device, the change in speed, the location, direction, destination, posted speed limit at the location of the remote mobile device, and the like.

Notifications may be sent if an attempt to disable the restriction system is detected. For instance, if there is an attempt to access the master user account from the remote mobile device, if the battery is taken out of the remote mobile device, if associated application information is deleted from the remote mobile device, or if location acquisition capabilities (such as global positioning information) are disabled.

Notifications may be sent when an application of the device is accessed including web browsers, game applications, text messaging, voice communications, or specific websites in a web browser. A list of approved applications and websites may be provided in the management information. Use of such approved applications or visits to those websites will not cause a notification to be sent to the master user device. Access of authorized content may be partially restricted and limitations of the partial restrictions may be included in the management information. The notification rules may be set based on time of day, type of activity, or by user. Notification information may be controlled from the master user account at any time. All notifications may be turned "on" or "off" by the master user device.

FIG. 3d illustrates an example process flow 304 for remote mobile device management including both restrictions of the remote mobile device and monitoring of the remote mobile device by sending notifications regarding activity of the remote mobile device to the master user. In flow process step 314, management information including restriction activation information and notification activation information from the master user account may be sent from the master user account to servers 130. The restriction/notification activation information indicates whether none, one, or both of the restriction and notification systems are "on" or "off." Restriction/notification condition information may also be included in the management information sent to the servers 130 or preset default conditions may be set if no restriction/notification condition information is included in the management information. The ability to enable and disable the restriction and notification systems both independently and together provides the master user with flexibility to control the restriction and notification systems from a remote location at any time.

In flow processes 324 through 384, restrictions and notifications are provided similarly to the other disclosures herein; accordingly, repetition will be avoided. A restriction may be coupled with a notification so that a status notification is sent to the master user indicating that a restriction has been enabled or disabled. The condition occurrence may be identical for both the restriction and the notification. The notification may be sent based on the indication that the notification condition has been met based on the indication sent to the servers 130. The restriction may be enabled based on either the indication that the restriction condition has been met that was sent to the servers 130. The enablement of the restriction may alternatively occur directly in flow process step 354 based on the occurrence of the restriction condition itself and not based on the servers 130 receipt of an indication that the restriction condition has occurred.

The management of the remote mobile device may occur based on a combination of restrictions and notifications. Some restrictions and notifications may share or have identical conditions. Some restrictions and notifications may require the occurrence of multiple conditions, some of which may be identical to other condition occurrences for separate restrictions and/or notifications.

For example, a driving based remote device management system may include both a motion-based driving restriction and a speed based notification system. Accordingly, the remote mobile device may be subject to restriction while the device user is driving and notifications may be sent to the master user if speeding occurs or if a maximum speed condition occurs at any time while the device is in motion. Additional notifications may be set so that the master user is notified when device capabilities have been restricted based on motion.

Any of the restrictions or any of the notifications may be implemented in a remote device management system that includes device tampering notification. Accordingly, during any other process of restriction and/or notification, an device tampering notification may be sent if the device or restriction/notification application is tampered with.

Notifications may also be set through the master user account so that a notification is sent automatically from the servers 130 at a scheduled time or throughout a regularly occurring interval. These types of notifications may be used by the master user as reminders to update, change, or turn "off" and "on" the restrictions and/or notifications of the remote mobile devices that are associated with the master user account.

The subject technology may include preset combinations of one or more restrictions, one or more notifications, or a combination of one or more restrictions and notifications for selection by the master user for each remote mobile device that is controlled. Preset combinations may provide some opportunity to customize the type of restriction, content of notification, and threshold amount or may provide preset values, notification content, and restrictions.

A master user may be able create, save, copy, or transfer partially preset combinations of management information or a completely customized set of management information based on a combination of restrictions and/or notifications. Customized combinations may be transferrable between master user accounts and/or may be transferable between remote mobile devices. Names for preset combinations may be provided based on a typical practical application for easy reference. Geographic boundaries for locations may be created and saved. Combinations and saved portions of management information may be saved and accessed from the master user account at any time.

Examples of preset combinations of management information for combinations of restrictions and/or notifications may include: speed zone mode, school mode, unauthorized location mode, work mode, sleep mode, and study mode. Customization based on master user entered or selected information may be provided through management information and the processes, systems, and combinations for preset and partially preset combinations may be implemented in the processes, systems, and combinations as a part of the subject technology as previously disclosed herein.

Speed zone mode may include email notifications to the master user if the driver is exceeding the posted speed limit of a road on which the remote mobile device is located with additional notifications via email if an attempt is made by the user to disable the application.

School mode may include a master user entered location of the school via the school's address. A radius may be preset at one mile or set by the master user. Notifications may be sent via text/and or email to the master device associated with the master user and master user account when the remote mobile device arrives at the school campus and when the remote mobile devices leaves. The content of the arrival and departure notifications may include time, date, and location. Additional notifications via text and/or email notifications may be sent to the master device when any application on a list of predetermined applications and/or websites is used on the remote mobile device. Additionally, notifications may be sent to the master user device when calls are made to telephone numbers that do not appear on an authorized caller list made of both preset authorized call numbers such as emergency services and authorized call numbers that are selected by the master user via the management information through the master user account. The notifications may all be turned "on" or "off" based on notification activation information at any time. A device tampering notification may be enabled. A school mode preset combination may also include an option to include time-based restrictions.

Unauthorized location mode may include a master user entered unauthorized location-based on an address and a radius. Email notifications may be sent to the email address associated with the master user account when the remote mobile device enters or leaves the unauthorized location. All device capabilities except emergency services and authorized calls may be restricted, and a notification may be sent to the remote mobile device via a specialized restriction screen with notification content indicating that the user of the remote mobile device has entered an unauthorized location. Further customization of a notification to the remote mobile device user may indicate that the user should leave the unauthorized area immediately. A notification in the form of a phone call may automatically be initiated from the remote mobile device to the master device upon entering the unauthorized location. Upon connection of the phone call, an automated notification message may indicate to one or both of the master user and the user of the remote mobile device that the call has been initiated based on the arrival at an the unauthorized location. Device tampering notifications may be further included.

Work mode may have both time and geographic location conditions that restrict non-work related device capabilities. Time ranges may be selected to reflect the business day, and the employer's address may be selected as the location. An employer or representative of the company may receive notifications based on the use of applications on the remote mobile device, and for some calls, such as long distance calls.

The long distance service costs may be included in the content of the notification message. Durations of time may be allotted to some device capabilities such as social networking, web browsing, specific websites, phone calls to the remote mobile device user's family or other identified individuals. Device tampering notifications may also be included.

Sleep mode may have time-based selections for school night, weekends, or custom capabilities during which predetermined applications such as game applications, text messaging, and social networking may be restricted. Authorized callers to or from those callers may not be restricted.

Study mode may include a time-based condition so that a time range (e.g. from 6 pm-8:30 pm) during which notifications will be sent to the master user if the remote mobile device is used for anything other than a list of predetermined authorized device capabilities. Specific telephone numbers, websites, or device applications may be restricted. Device tampering notifications may also be included.

FIGS. 4a-4d are illustrations of various example graphical user interfaces of the remote mobile device and also illustrate various example graphical user interfaces of the master device and web browsers allowing access to the master user account in accordance with the subject technology.

FIG. 4a is an illustration of a remote mobile device with specialized display during enabled restriction of remote device management.

Remote mobile device/controlled client 140 may be a smartphone with a touchscreen. In an application in which the use of the touchscreen is restricted (e.g., a driving/motion-based restriction mode), a specialized screen may be displayed to the remote mobile device user while the restriction is enabled. The display 430 may include an authorized caller list 420 that may be customized by the master user via management information provided through the master user account. Access to preset authorized caller information such as an emergency services 410 may be provided through graphical component on the specialized display. Voice calls to the individuals on the authorized caller list 420 or to emergency services 410 may as calls may be placed by touching the graphical interface to place a telephone call to the intended authorized caller.

Other portions of the device display may be used to provide notifications 440 to the remote device user based on additional notification information. An automatic notification indicating that the restriction is in place may be displayed on display 430 for the duration of the restriction. In other examples, a custom notification may warning the user of their speed may appear on the remote mobile device user's display 430 while a speeding notification is also sent to the master user.

Figure 4B:
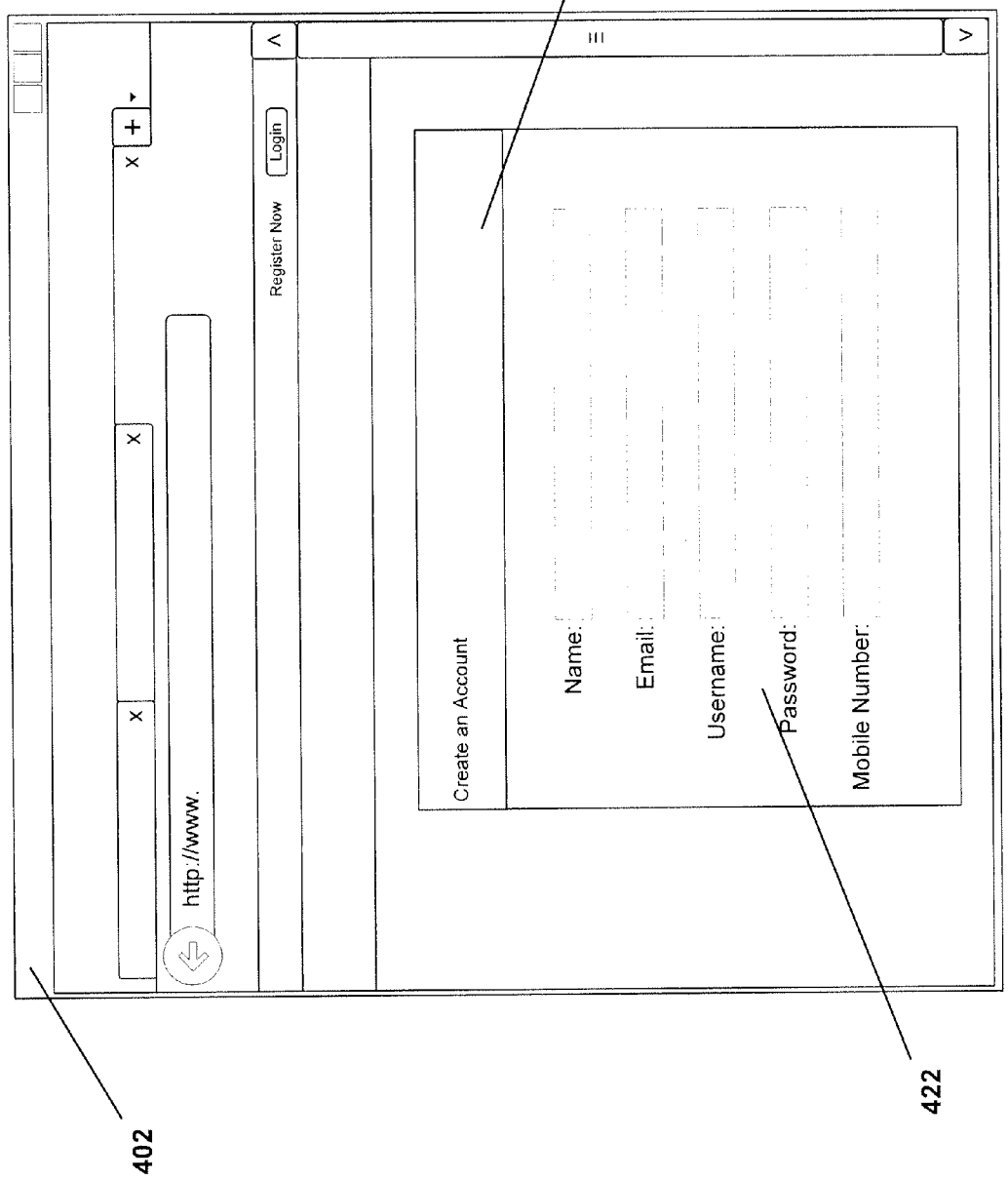

FIG. 4b is an illustration of a web browser user interface for creating a master user account. Web browser 402 may be accessed from a device that becomes the master user device following the creation of the master user account. Web browser 402 may also be accessed by a client device 110 that will not be later associated with the master user account. Graphical interface components 412 and 422 may appear identically on an installed application on a master device without the necessity of web browser 402. Graphical component 412 provides the interface to create a new master user account. Multiple graphical interface screens may be required to complete the request and creation of the master user account. Graphical components 422 allow the master user to enter master user information for the master user account. Information such as a name, email, username, password, and mobile number may be entered for the newly created master user account. Account information entered while creating a master user account may later be updated or removed by using similar graphical interfaces at any later time.

Figure 4C:
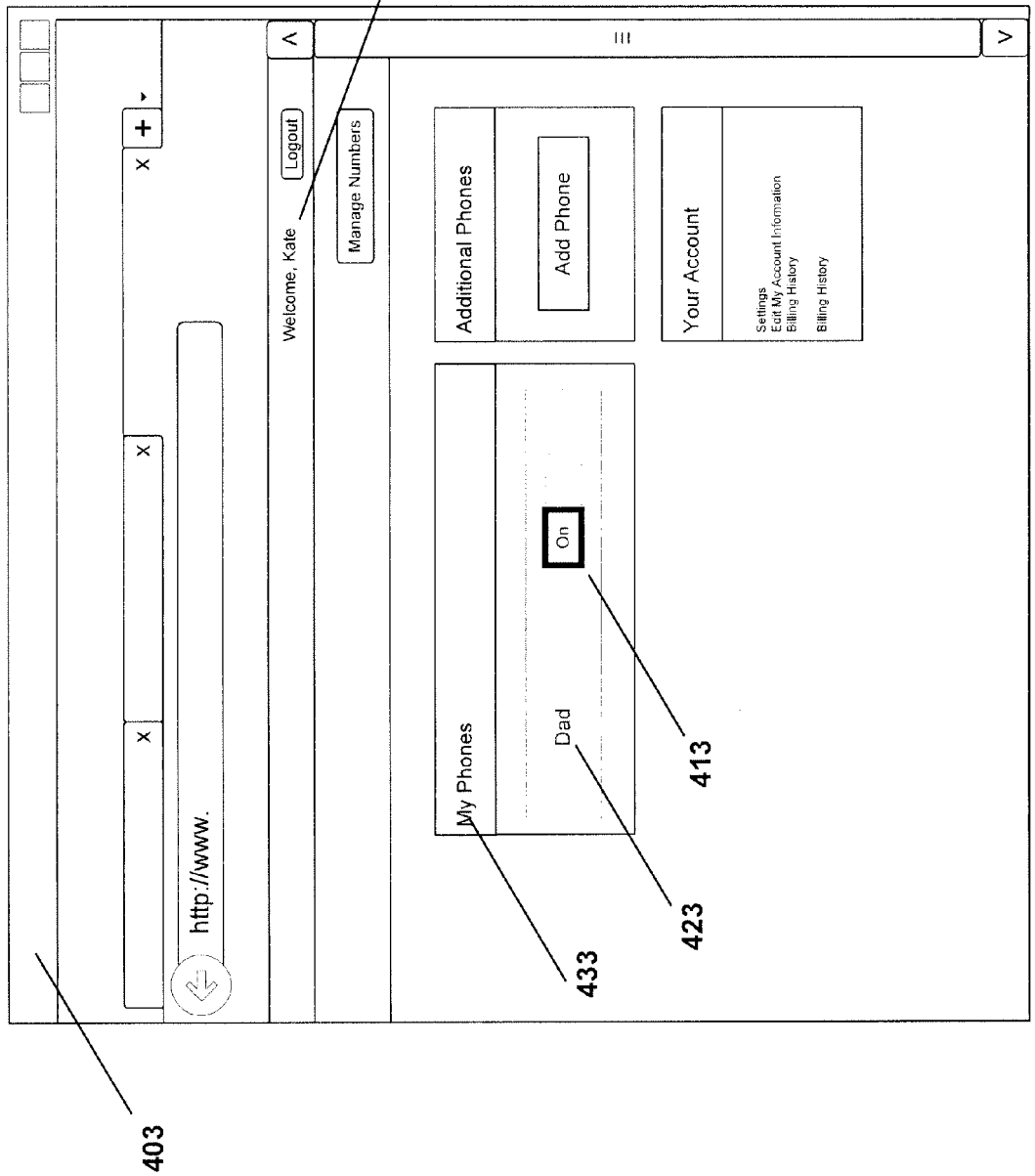

FIG. 4c is an illustration of a web browser user interface of the master user account in which restriction/notification activation information may be changed by the master user. Web browser 403 may be installed on a master device or may be accessed on another client device used by the master user. The web browser allows website access to the restriction/notification system and provides an interface in which activation information may be adjusted by the master user at any time. Once logged into the master user account 443, remote mobile devices that have been associated with the master user account 433 may be managed from web browser 403. User names 423 associated with the controlled client 140 may be displayed instead of other identifying information for easy use. Restriction and/or notification activation information may be updated for the remote mobile device at any time by the master user. The restriction and/or notification activation may be turned "on" and "off" with graphical component 413. Selection of "on" or "off" through the graphical component 413 changes the management information associated with the respective remote mobile device user 423. Accordingly, the remote mobile device associated with "Dad," may be managed at any time of the master user's choosing.

Use of an application via a master device may provide identical display components 413, 423, 433, and 443 through an installed application on a master device that allows access to the master user account without the necessity of a web browser.

Figure 4D:
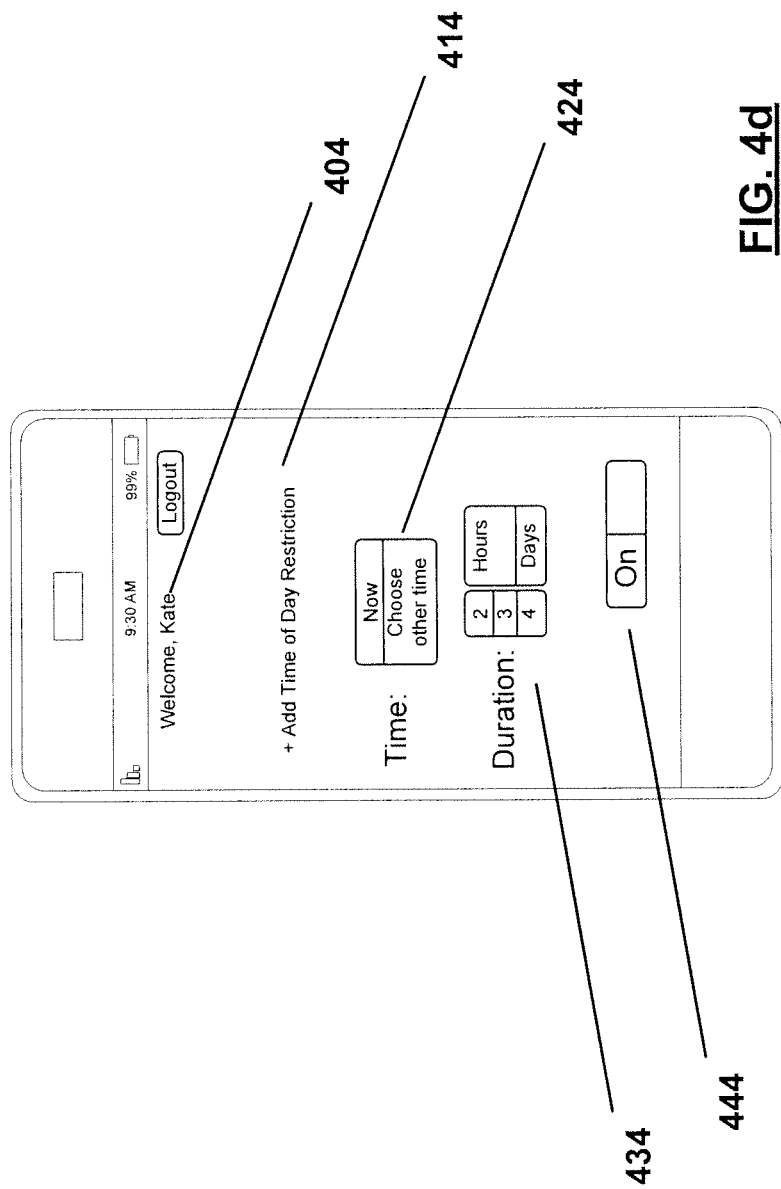

FIG. 4d is an illustration of a restriction/notification application user interface of the master user account in which restriction/notification activation information may be changed by the master user. An application such as a restriction/notification application may associate the master user 404 with the master user device. A password may be required to log into the application on the master device. The application may allow a master user to log into another device with the restriction/notification application installed and log into the master user account using master user information, a password, and/or other security measures. The graphical interface of FIG. 4d is representative of a single example of a graphical user interface for management information of a master user account. Many screens may be associated with the master user in order to provide the master user with the ability to fully customize the management information associated with each remote mobile device of the master user account. Separate screens may provide options to add restrictions such as a time of day restriction 414, select times by hour or other methods of selecting time 424, a duration of time such as a number of hours or days 434, and may include individual "on" and "off" selections for each restrictions.

Although not shown, other possible options that may be presented in related graphical interface to FIG. 4d include, but are not limited to: selection of type of notification; selection of multiple types of notifications; entry of authorized callers information; entry of nickname or user name information associated with remote device users, authorized callers, or other users associated with the system; entry of billing information; access to billing statement information; entry of information regarding the registration of a new remote mobile device to be associated with the master user account; entry or selection of a speed notification threshold amount; entry or display of a token code available only to the master user and used to physically authorize the association of remote mobile devices with the master user account; entry or selection of location information for geographic boundary conditions including address, street, state, apartment number, city, state, zip code, and radius of boundary; selection of notification content; entry of customized notification content; selection or entry of notification content to be displayed on the remote mobile device; selection or entry of approved or restricted applications; selection or entry of approved or restricted websites; selection, customization, or creation of customized, saved, or preset combinations of management information; and selection or entry of device capabilities for restrictions.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
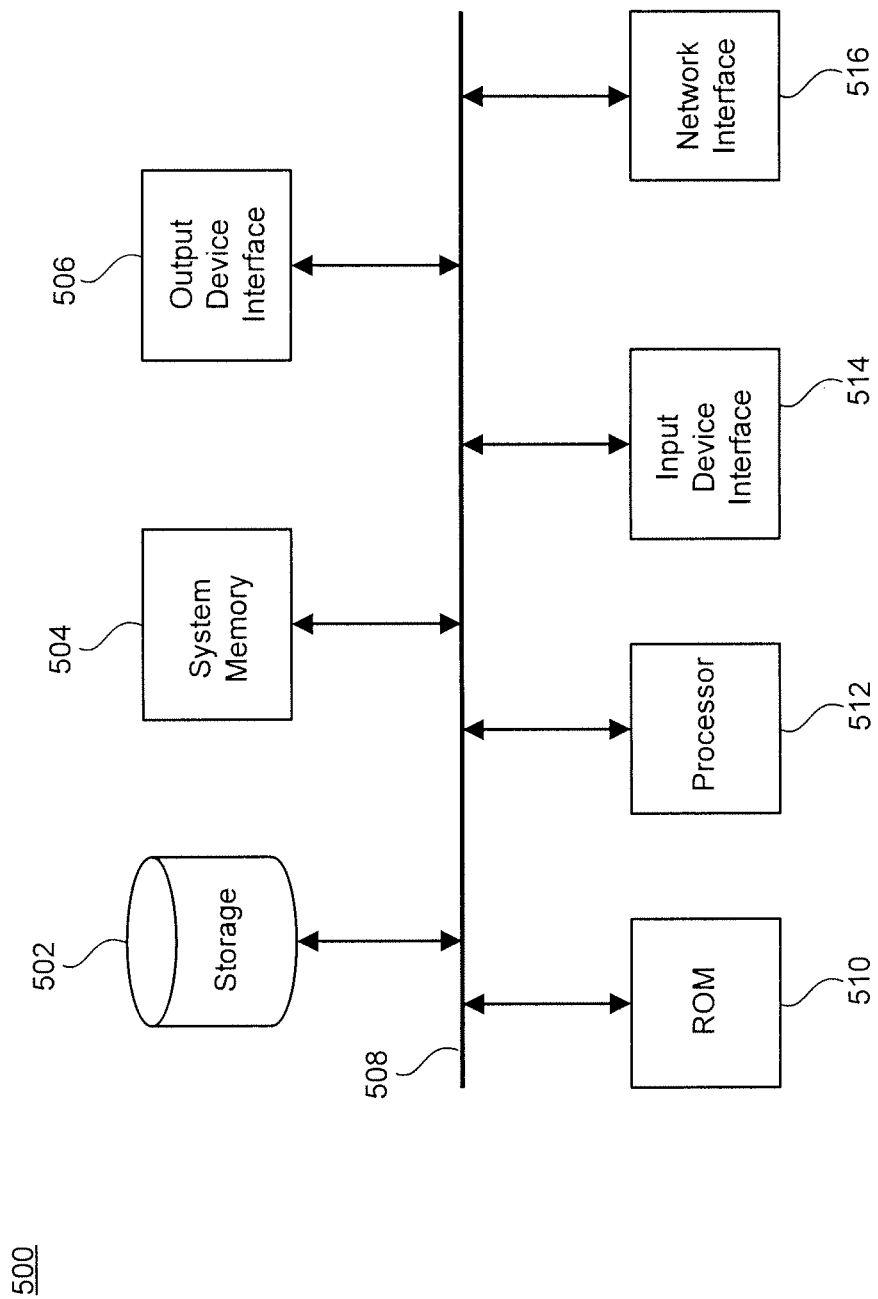
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for remote device management in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject technology described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A system for remote mobile device management, the system comprising:
   one or more processors; and
   a memory containing processor-executable instructions that, when executed by the one or more processors, cause the system to:
      receive management information from a master user account that is associated with a remote mobile device, wherein the management information includes notification activation information and a speed threshold;
      receive an indication when a restricted device capability is accessed by the remote mobile device at the same time the remote mobile device is moving above the speed threshold; and
      send a notification to the master user account based on receipt of the indication and the notification activation information.

2. The system of claim 1, wherein the management information includes restriction activation information and wherein the system is further caused to:
   receive an indication of movement when the remote mobile device is moving at a speed above a restriction threshold;
   provide for a restriction of at least one device capability of the remote mobile device based on the restriction activation information and the indication of movement;
   receive an indication of deceleration when the remote mobile device has decelerated; and
   provide for restoration of the at least one device capability based on the indication of deceleration.

3. A system for remote mobile device management, the system comprising:
   one or more processors; and
   a memory containing processor-executable instructions that, when executed by the one or more processors, cause the system to:
      establish a master user account based on a request from a master user;
      receive a request to associate a remote mobile device with the master user account;
      associate the remote mobile device with the master user account;
      receive management information from the master user account that is associated with the remote mobile device, wherein the management information includes notification activation information;
      receive a notification indication when a restricted device capability is accessed by the remote mobile device at the same time that the remote mobile device is moving at a speed above a notification threshold, based on the notification activation information;
      send a notification to the master user account based on receipt of the notification indication.

4. The system of claim 1, wherein the speed threshold is a predetermined rate of speed above a posted speed limit.

5. The system of claim 2, wherein the management information further comprises at least one authorized caller and wherein voice communication capabilities with any authorized caller are maintained during the restriction of the at least one device capability of the remote mobile device.

6. The system of claim 2, further comprising to send a speeding notification to the master user account based on receipt of the indication of movement.

7. The system of claim 2, wherein the at least one device capability includes responding to at least one type of inbound communication, wherein the system is further caused to:
   provide for the sending of an automated response from the remote mobile device to each inbound communication if the at least one device capability is restricted.

8. The system of claim 7, wherein the at least one type of inbound communication includes one or more of telephone calls, short message services, text messages, image messages, and electronic mail.

9. The system of claim 7, wherein the automated response includes an advertisement.

10. The system of claim 2, wherein the at least one device capability is based on capability restriction information included in the management information.

11. The system of claim 2, wherein the providing for the restriction of at least one device capability causes at least one application of the remote mobile device to be disabled.

12. The system of claim 2, wherein the restriction activation information provides for the overriding of one or more restrictions of the remote mobile device.

13. The system of claim 1, wherein the management information can only be altered via the master user account.

14. The system of claim 1, wherein the system is further caused to:
   receive an indication of device tampering when at least one of removal of a power supply of the remote mobile device or disabling of a global positioning system capability of the remote mobile device occurs; and
   send a device tampering notification to the master user account.

15. The system of claim 2, wherein the management information includes a delay time, and wherein the system is further caused to:
   delay the restoration of the at least one device capability for the delay time following the indication of deceleration.

16. The system of claim 2, wherein the management information includes the restriction threshold.

* * * * *